No. 619,458. Patented Feb. 14, 1899.
C. S. WOOD.
METHOD OF AND MEANS FOR EXTERMINATING WEEDS.
(Application filed Nov. 18, 1897.)
(No Model.)
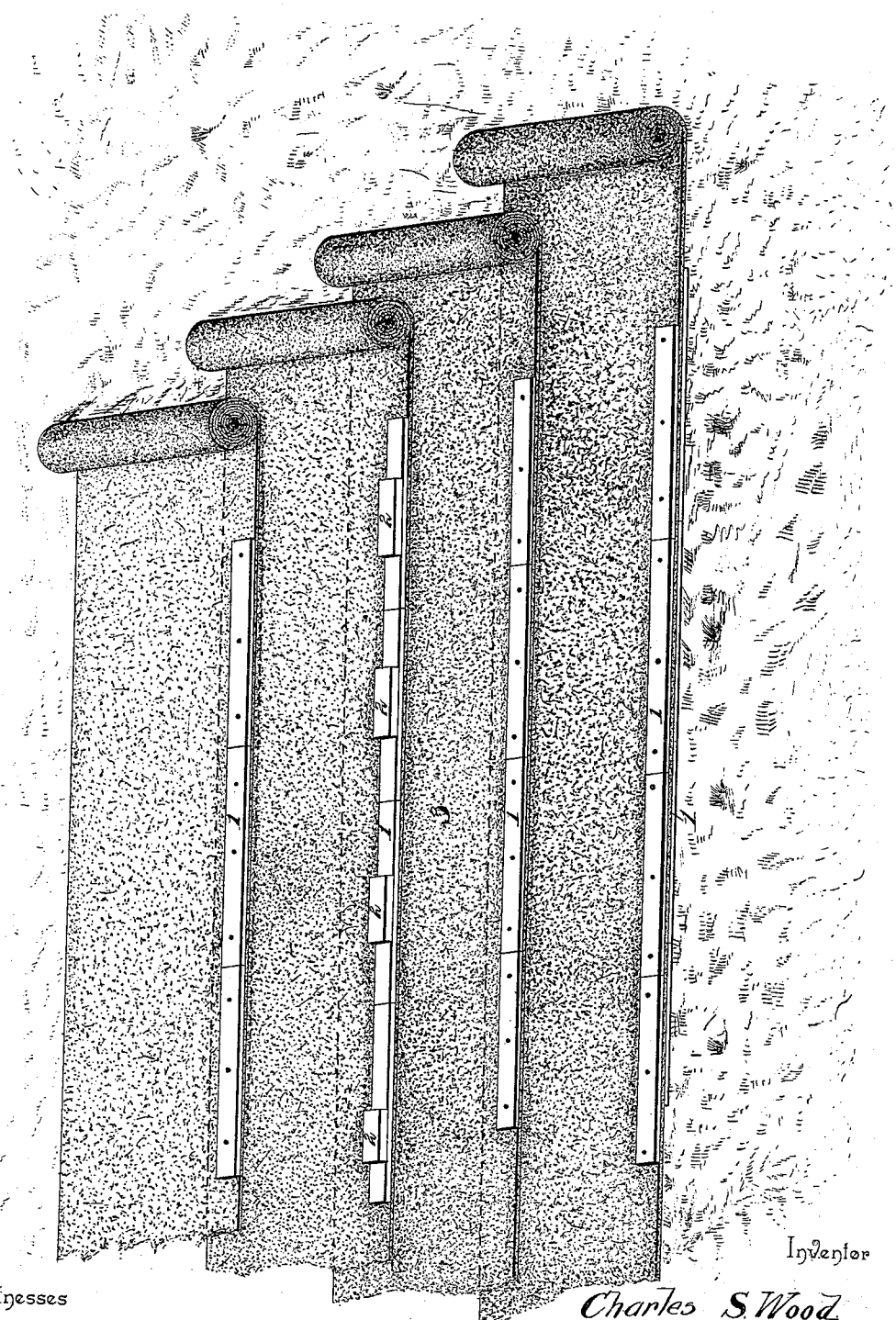
Witnesses
R. H. Shepard.
V. B. Hillyard.
By his Attorneys,
C. A. Snow & Co.
Inventor
Charles S. Wood
THE NORRIS PETERS CO., PHOTO-LITHO., WASHINGTON, D. C.

UNITED STATES PATENT OFFICE.

CHARLES S. WOOD, OF BERLIN, WISCONSIN.

METHOD OF AND MEANS FOR EXTERMINATING WEEDS.

SPECIFICATION forming part of Letters Patent No. 619,458, dated February 14, 1899.

Application filed November 18, 1897. Serial No. 659,004. (No specimens.)

*To all whom it may concern:*

Be it known that I, CHARLES S. WOOD, a citizen of the United States, residing at Berlin, in the county of Green Lake and State of Wisconsin, have invented a new and useful Method of and Means for Exterminating Weeds, of which the following is a specification.

Many devices have been devised for reclaiming land overrun by weeds and obnoxious growths, such as the thistle and snapdragon and the like, which have been more or less effective; and the present invention has the same object in view—that is, the extermination of such weeds and objectionable growths.

In accordance with this invention a solution of such strength and nature as to destroy plant life is sprinkled upon the land overrun with the weeds and the ground so treated is covered to prevent the evaporation of the solution and cause the same to penetrate the soil and destroy the growths desired to be killed. The first step is to level the weeds or objectionable plants by cutting them down as close to the surface of the ground as possible, then applying the plant-killing solution prepared in the manner presently to be described, and finally clothing the land treated with the solution by means of paper or other cheap material impervious to air, whereby the fumes and strength of the solution are confined and caused to penetrate the soil, so as to kill all plant life therein.

The accompanying drawing illustrates the preferred manner of clothing the land after the solution has been applied thereto, the covering being provided in the form of rolls or bolts and consisting of tarred paper, felt, or the like, which is cheap and impervious, thereby preventing the strength of the solution escaping, which is of vital consequence to the effectiveness of the invention.

In preparing the plant-killing solution two gallons of tar and ten gallons of water are placed together in a suitable receptacle or tank and are thoroughly agitated and heated. Twenty-five pounds of crude potash and five pounds of alum are dissolved in about forty gallons of water in a second receptacle or tank, and this latter mixture is heated, after which the mixture of tar and water previously prepared is added to the solution of potash and alum and the whole thoroughly stirred.

The land from which the weeds or objectionable plants are to be exterminated is treated by first mowing or cutting down the weeds, after which the solution prepared, as herein described is sprinkled thereon and the whole is protected by a covering to prevent the evaporation and escape of the solution and cause the same to penetrate the soil to a depth so as to effectually destroy the plant germs.

Tarred paper is found best adapted for clothing the land and only so much of the latter is sprinkled with the solution as can be quickly covered, so as to prevent loss by evaporation. This tarred paper or covering is unrolled upon the ground, and the longitudinal edge portions are overlapped and are secured together between upper and lower strips or laths 1, which are arranged to break joint and which are secured together by brads or tacks. Weights of any kind, as stones 2, may be placed upon the laths or strips to prevent wind from blowing the covering away. Every third strip of covering must lap more than the other two strips and must be left loose, so as to provide and allow for shrinking and obviate tearing of the covering-strips. This third covering-strip is indicated at 3.

It will be understood that the ingredients entering into the solution may be variously proportioned, according to the nature of the weeds or plants to be exterminated and according to the character of the soil and climatic conditions.

Having thus described the invention, what is claimed as new is—

1. The herein-described method of exterminating weeds and like growths, consisting of applying to the growth a solution of tar, crude potash, alum, and water, and then covering the ground bearing the growth with a covering of impervious material to prevent evaporation of the solution, and to cause the same to penetrate the soil, substantially as described.

2. A ground-covering for use in the extermination of weeds and like growths, consisting of a plurality of sheets of impervious material arranged in parallel relation with their contiguous edges overlapping, and superposed clamping-strips arranged longitudinally of the sheets, said superposed clamping-strips being secured together and receiving therebetween the overlapping edges of the sheets, substantially as described.

In testimony that I claim the foregoing as my own I have hereto affixed my signature in the presence of two witnesses.

CHARLES S. WOOD.

Witnesses:
A. L. TUCKER,
A. SHIPMAN.